United States Patent [19]

Yuuki et al.

[11] Patent Number: 5,690,444
[45] Date of Patent: Nov. 25, 1997

[54] CORD EQUIPPED WITH CONNECTOR

[75] Inventors: Kenji Yuuki; Akiyoshi Kando; Masato Yokota; Hitomi Kawamura, all of Toyama-ken, Japan

[73] Assignee: YKK Corporation, Tokyo, Japan

[21] Appl. No.: 657,050

[22] Filed: May 29, 1996

[30] Foreign Application Priority Data

Sep. 29, 1995 [JP] Japan ................... 7-253112

[51] Int. Cl.$^6$ .................. A44B 21/00; A44B 19/26; A45C 13/30
[52] U.S. Cl. .................. 403/268; 403/266; 24/429; 24/431
[58] Field of Search ................... 403/269, 268, 403/267, 266, 265; 24/429, 431, 265 EE

[56] References Cited

U.S. PATENT DOCUMENTS

| | | | |
|---|---|---|---|
| 2,347,229 | 4/1944 | Woodbury | 403/268 |
| 3,462,803 | 8/1969 | Horton | 403/267 |
| 3,512,223 | 5/1970 | Willinger | 403/269 X |
| 3,762,753 | 10/1973 | Yulkowski | 403/269 X |
| 4,760,991 | 8/1988 | Asai . | |
| 5,152,481 | 10/1992 | Cote et al. | 403/268 X |

FOREIGN PATENT DOCUMENTS

| | | | |
|---|---|---|---|
| 1-48761 | 10/1989 | Japan . | |
| 6-189810 | 7/1994 | Japan . | |
| 993510 | 5/1965 | United Kingdom . | |
| 998767 | 7/1965 | United Kingdom . | |
| 1051558 | 12/1966 | United Kingdom | 403/268 |
| 1120134 | 7/1968 | United Kingdom . | |
| 2 088 713 | 6/1982 | United Kingdom . | |
| 2 091 770 | 8/1982 | United Kingdom . | |
| 2 236 546 | 4/1991 | United Kingdom . | |

OTHER PUBLICATIONS

Jones et al., "Cable Tape End Fitting", IBM Technical Disclosure Bulletin, vol. 20, No. 12, p. 5118, May 1978.

Primary Examiner—Anthony Knight
Attorney, Agent, or Firm—Hill, Steadman & Simpson

[57] ABSTRACT

In a cord equipped with a connector, a metal or synthetic resin tube has at one end a connecting ring and in its wall a through-hole communicating with a hollow of the tube. End portions of a cord are inserted in a trued-up form in the hollow from an opening of the connector. The hollow and the through-hole are filled with a molded core insertion-molded of synthetic resin so that the molded core is prevented from accidental removal from the hollow, thus firmly holding the end portions of the cord. This connector-equipped cord is particularly useful when applied to a pull string of a second bag or a slider pull tab of a slide fastener.

22 Claims, 8 Drawing Sheets

CORD EQUIPPED WITH CONNECTOR

BACKGROUND OF THE INVENTION

1. Field of the Invention

This invention relates to a small-sized cord to be used as a slider pull tab when a slide fastener is attached to an opening of a change purse or a pouch, and to a relatively large-sized cord to be used as a pull string of a second bag, a folding umbrella, a transistor radio, etc.

2. Description of the Related Art

Generally, a pull string of a second bag, a folding umbrella, etc. is a string or cord threaded through a ring or a swivel and its ends are fixed by a screw or a ring holder and the ring or a swivel is attached to the second bag, the folding umbrella, etc. In another conventional form, a cord or string is threaded through a hole of an free end of a slider pull tab for a slide fastener and is fixed by a screw, the slide fastener being attached to an opening of a change purse or a pouch.

Figure 16:
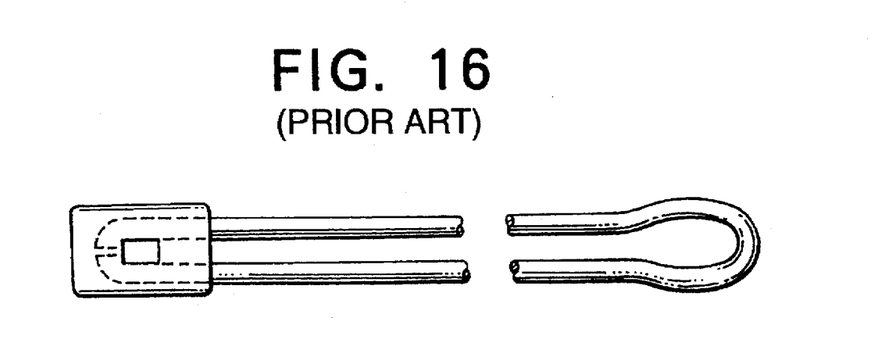
FIG. 16 is a front view of a conventional cord.

FIG. 16 of the accompanying drawings shows a cord disclosed in Japanese Patent Publication No. Hei 1-48761, in which end portions of the cord are embedded in a trued-up form in a molded end of a thick synthetic resin plate having a central through-hole.

Figure 17:
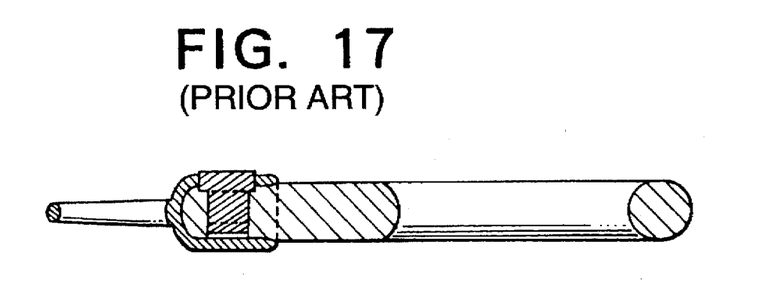
FIG. 17 is a cross-sectional view of a conventional pull tab for a slide fastener slider.

FIG. 17 shows a slider pull tab, for a slide fastener, disclosed in Japanese Patent Laid-Open Publication No. Hei 6-189810, in which a grip strip is integrally molded with one end of a metal clamper having at one end an inlet and in an upper surface an opening perpendicular to the grip strip. In production, with a plug inserted into the clamper from the opening, elastic material such as soft synthetic resin is injected into the clamper from the inlet to form the grip strip. The plug has a closure portion and a stopper portion.

With the conventional pull string using a ring or a swivel, since after the string is inserted through and then bent around the ring or a swivel, the bent portion of the string is fixed by a screw or a ring holder, a large stress is exerted on the turnover of the string when the string is pulled and/or twisted, so that the string can be damaged and hence cannot be durable for repeated use.

According to the first-named publication, since end portions of the cord are embedded in a trued-up form in an injection molded end of synthetic resin, only a non-stable attachment of the cord can be achieved. According to the second-named publication, an existing cord or string cannot be used.

SUMMARY OF THE INVENTION

It is therefore a first object of this invention to provide a cord equipped with a connector, which has a connecting ring to be connected to a second bag, a folding umbrella, etc., such that end portions of a tough round or flat cord can be firmly fixed to the connector without accidental removal during repeated use.

A second object of the invention is to provide a cord equipped with a connector in the form of a cylindrical tube suitable for use with a round cord.

A third object of the invention is to provide a cord equipped with a connector in the form of a generally C-shape plate suitable for use with a flat cord.

A fourth object of the invention is to provide a cord equipped with a connector in a specified form having an excellent performance.

A fifth object of the invention is to provide a cord equipped with a connector having an ornamental feature and a removal-preventing feature.

A sixth object of the invention is to provide a cord equipped with a connector, which is suitable for use with a flat cord, having a removal-preventing feature and an ornamental feature.

A seventh object of the invention is to provide a cord equipped with a connector, which is suitable for use with a soft delicate-touch cord having end portions processed by molding, facilitating attaching the cord to the connector.

An eighth object of the invention is to provide a cord equipped with a connector suitable for use with a pull string.

In order to accomplish the above objects, according to a first aspect of the invention, there is provided a cord equipped with a connector, wherein the connector, which comprises a cylindrical tube or a C-shape plate having a hollow, has at one end a connecting ring and at the other end an opening. End portions of the cord are inserted into the hollow from the opening. The end portions of the cord being fixed by a molded core insertion-molded of synthetic resin in the hollow, the hollow has a mechanism for preventing the molded core from accidental removal from the hollow.

According to a second aspect of the invention, the connector is a cylindrical tube having in its wall a number of through-holes communicating with the hollow, whereby the molded core is prevented from accidental removal from the hollow.

According to a third aspect of the invention, the connector is a generally C-shape plate having a number of ridges on its inner wall surface except its side edges, whereby the molded core is prevented from accidental removal from the hollow.

According to a fourth aspect of the invention, the connecting ring is pivotally mounted on a closed end of the connector.

According to a fifth aspect of the invention, the connector has in its wall a hieroglyphic through-hole in which the molded core is to be filled to reveal a hieroglyphic design.

According to a sixth aspect of the invention, the connector is a generally C-shape plate having a number of ridges on its inner wall surface except its side edges, the plate further having on each of front and rear walls a recess communicating with the hollow via a number of apertures, the recess having a number of ornaments thereon, the molded core being formed complementarily with the hollow and the recess to fix the end portions of the cord.

According to a seventh aspect of the invention, the end portions of the cord to be fixed to the connector is in the form of compressed and hardened portions which are to be inserted in the hollow and fixed by the molded core.

According to an eighth aspect of the invention, the cord fixed by the connector defines a loop at its free end.

DETAILED DESCRIPTION OF THE PREFERRED EMBODIMENTS

Various embodiments of this invention will now be described in detail with reference to the accompanying drawings.

Figure 1:
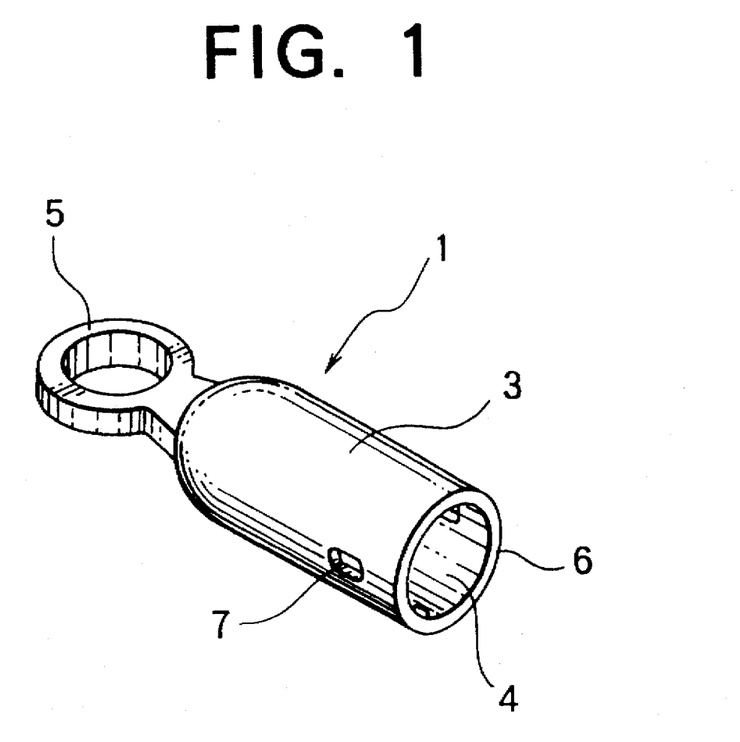
FIG. 1 is a perspective view showing a connector in the form of a cylindrical tube according to a first embodiment of this invention.
Figure 3:
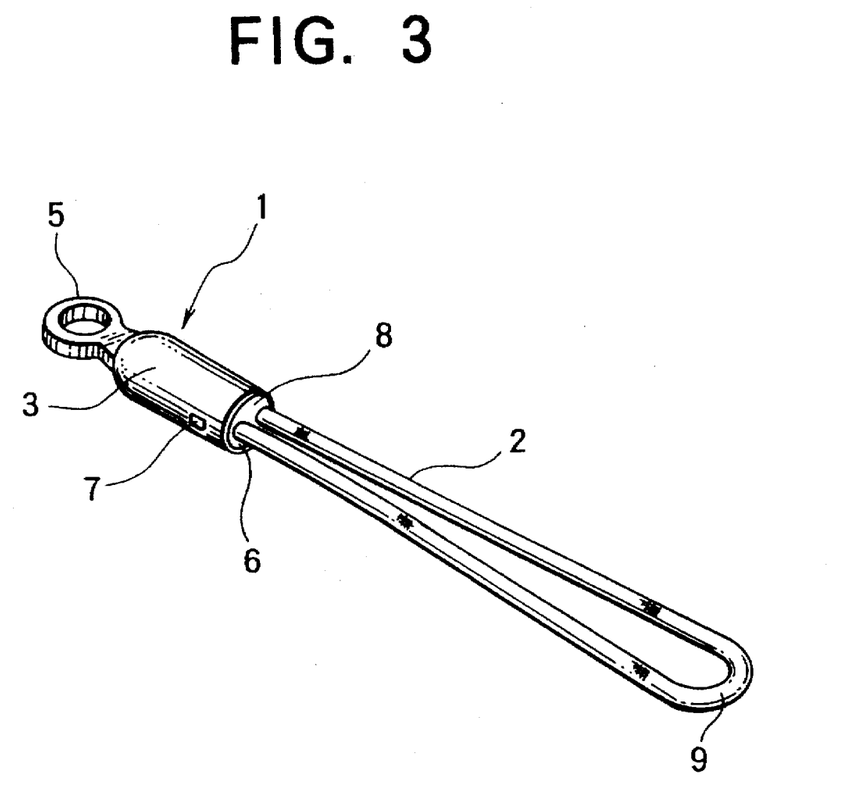
FIG. 3 is a perspective view showing a cord equipped with the connector of the first embodiment.

FIG. 3 shows a first embodiment of this invention in which a cord 2 is fixed to a connector 1. The connector 1 is in the form of a cylindrical tube 3 as shown in FIG. 1. The cylindrical tube 3 is molded by die-cast molding using metal, or synthetic resin such as polyamide, polyacetal, polypropylene or polybutyleneterephtalate to have a hollow 4 inside. The cylindrical tube 3 is closed at one end and has an integral connecting ring 5 projecting from the closed end outwardly.

The cylindrical tube 3 has at the other end an opening 6 and in its wall toward the opening 6 a number of through-holes 7 communicating with the hollow 4. Alternatively, the tube 3 may be flat, rectangular or otherwise in cross section.

Figure 2:
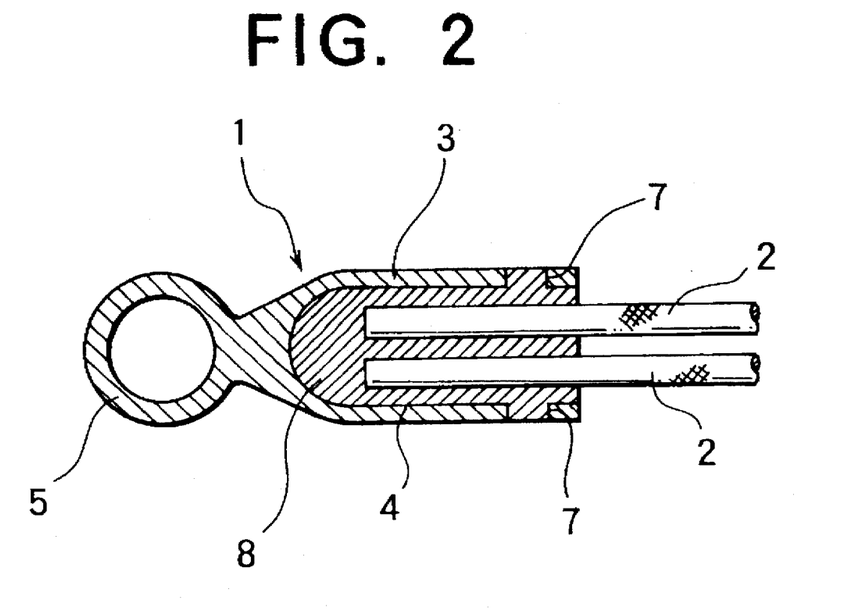
FIG. 2 is a cross-sectional view of FIG. 1, showing a cord fixed to the connector of the first embodiment.

A round or flat cord 2, in the form of a knitted cord, a combined cord or a leather cord, folded double so as to true up its end portions is inserted into the hollow 4 of the tube 3 from the opening 6, whereupon synthetic resin such as polyamide, polyacetal, polypropylene or polybutyleneterephtalate is insertion-molded in the hollow 4 to form a molded core 8 filling not only the hollow 4 but also the through-hole 7. In the presence of the through-hole 7, the molded core 8 is free from accidental removal from the hollow 4. With the cord 2 defining at a free end a loop 9, the trued-up end portions are fixed to the connector 1.

Assuming that the end portions of the cord 2 are flexible, an enlarged head may be formed by knotting each end portion, or further, the enlarged end portions may be hardened by soaking in epoxy resin liquid, thus making the cord 2 free from accidental removal from the molded core 8.

Figure 4:
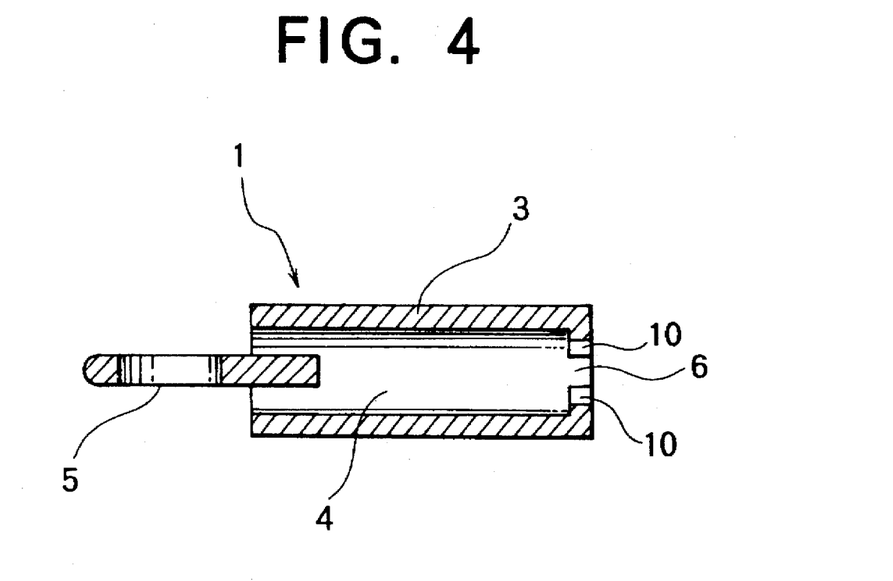
FIG. 4 is a cross-sectional view showing a connector in the form of a modified tube according to a second embodiment.
Figure 5:
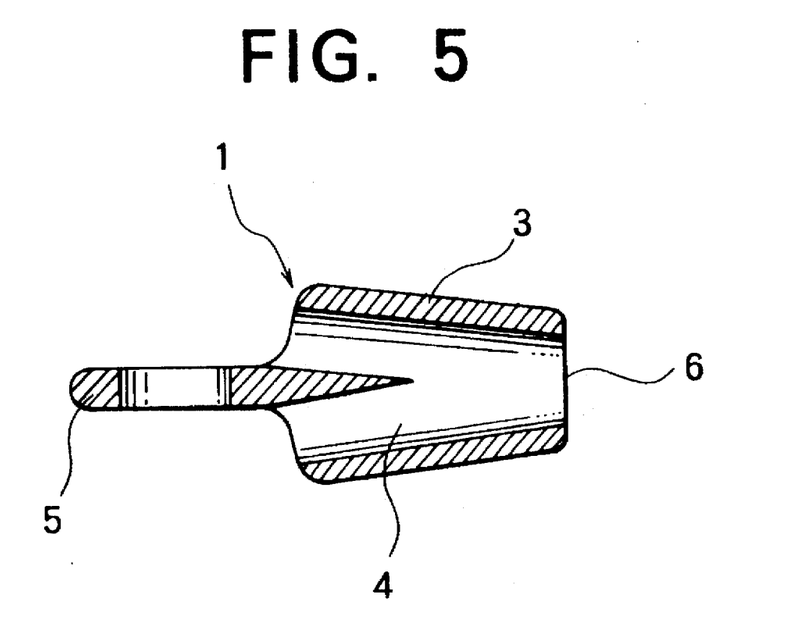
FIG. 5 is a cross-sectional view showing a connector in the form of another modified tube according to a third embodiment.

As shown in FIG. 4, the cylindrical tube 3 has at one end the connecting ring 5 and at the other end an inwardly directed flange 10, which prevents the insertion-molded core 8 from accidental removal from the tube 3. Further, as shown in FIG. 5, the tube 3 may be frusto-conical gradually decreasing in diameter toward the opening 6 from the closed end to prevent the molded portion 8 from removal from the tube 3.

Figure 6:
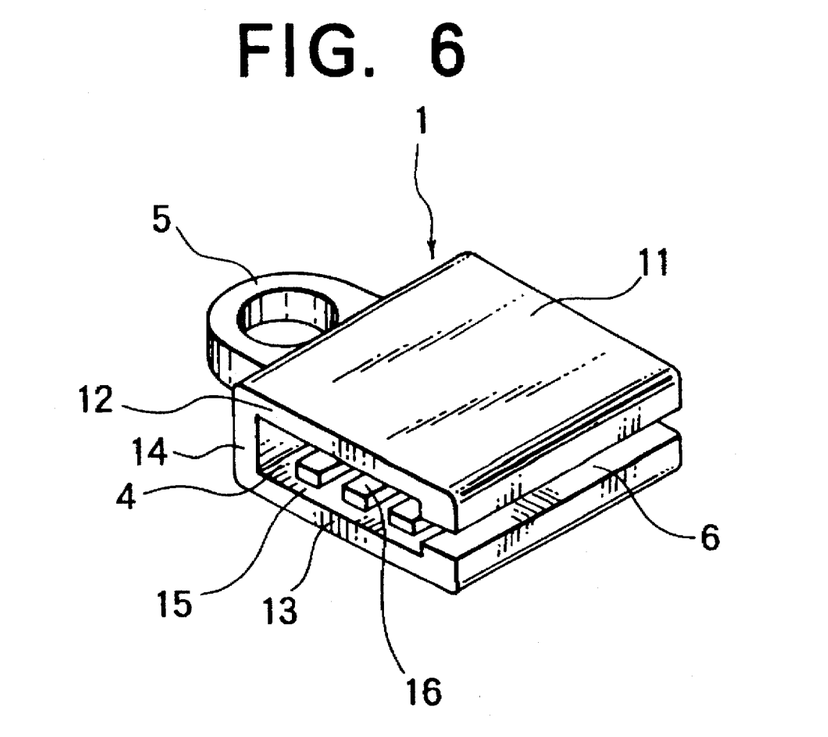
FIG. 6 is a perspective view showing a connector in the form of a generally C-shape plate according to a fourth embodiment.

Further, as shown in FIG. 6, the connector 1 may be in the form of a generally C-shape plate 11 molded by diecasting. The C-shape plate 11 is a unitary shape having an upper wall 12, a lower wall 13, and a connecting wall 14 bridging between the upper and lower walls 12, 13, there being a connecting ring 5 projecting integrally from an outer surface of the connecting wall 14. The C-shape plate 11 has a number of ridges 16 on the inner surface of each of the upper and lower walls 12, 13 except side edges 15. A groove may be substituted for the individual ridge 16.

Figure 7:
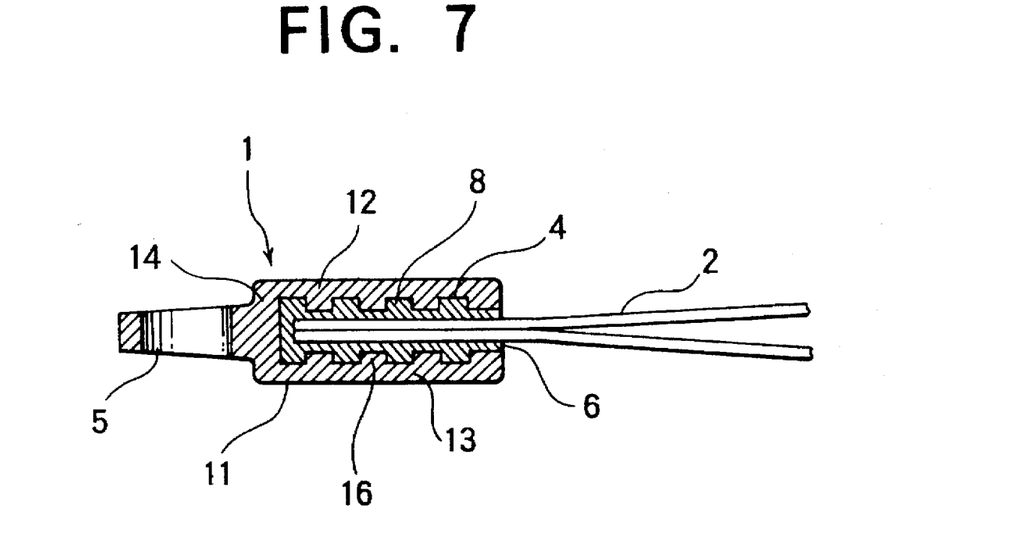
FIG. 7 is a cross-sectional view of FIG. 6, showing a cord fixed to the connector of the fourth embodiment.
Figure 8:
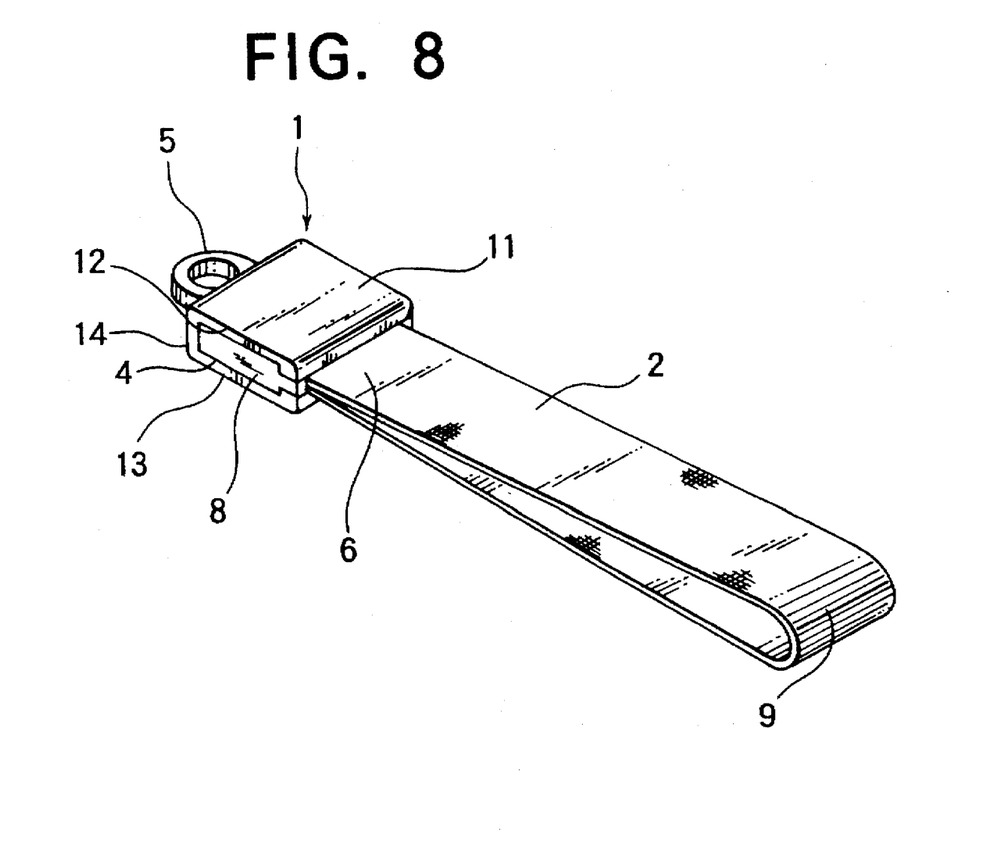
FIG. 8 is a perspective view showing a cord equipped with the connector of the fourth embodiment.

End portions of the cord 2 are inserted in a trued-up form into the hollow 4 between the upper and lower walls 12, 13 from the opening 6, whereupon a molded portion 8 is formed by insertion-molding synthetic resin in the hollow 4 to anchor the cord 2, as shown in FIG. 7. The hollow 4 between the upper and lower walls 12, 13 of the C-shape plate 11 is filled with the molded core 8 and the ridges 16 are arranged on the inner surface of the upper and lower walls 12, 13, the molded core 8 is prevented from being accidentally removed from the hollow 4, thus fixing the cord 2 to the connector 1 so as to form a loop 9 at a free end as shown in FIG. 8.

Figure 9:
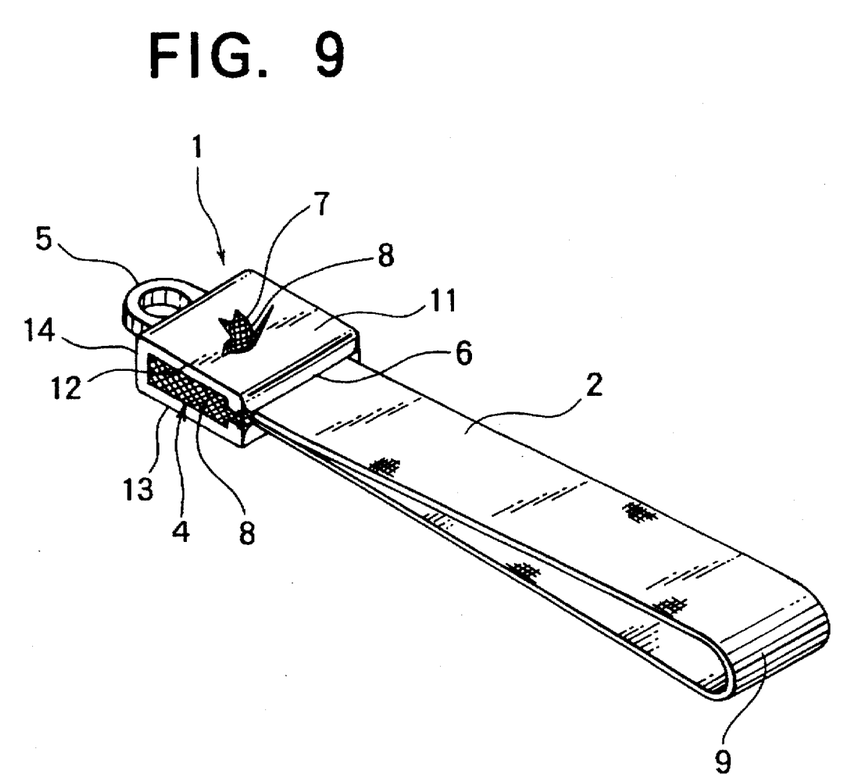
FIG. 9 is a perspective view showing a cord equipped with a modified connector according to a fifth embodiment.
Figure 10:
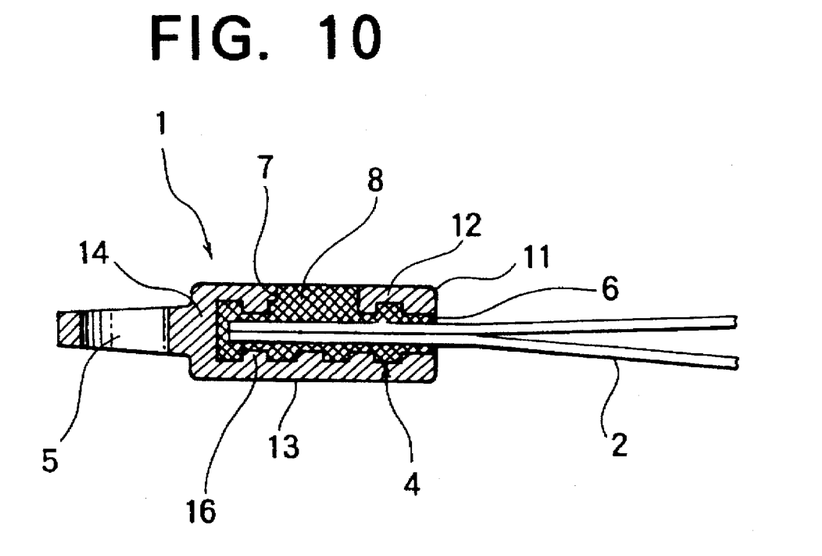
FIG. 10 is a cross-sectional view showing the connector of FIG. 9.

FIGS. 9 and 10 show another embodiment in which the connector 1 in the form of the generally C-shape plate 11 has in the upper wall 12 a hieroglyphic through-hole 7 so that the through-hole 7 also is filled with synthetic resin of the molded core 8 during insertion-molding in the hollow 4, thus displaying a hieroglyphic design on the upper wall 12 in a color of the molded core 8 different from the color of the connector 1. As long as the connector 1 has such a form as to display a hieroglyphic design, it is possible to prevent the molded core 8 from removal from the hollow 4 of the connector 1, even in the absence of the ridges 16 on the inner surface of the upper and lower walls 12, 13. The lower wall 13 also may have a hieroglyphic through-hole 7 so that a hieroglyphic design can be displayed on the outer surface of either walls, giving a neat appearance to the connector-equipped cord.

Figure 11:
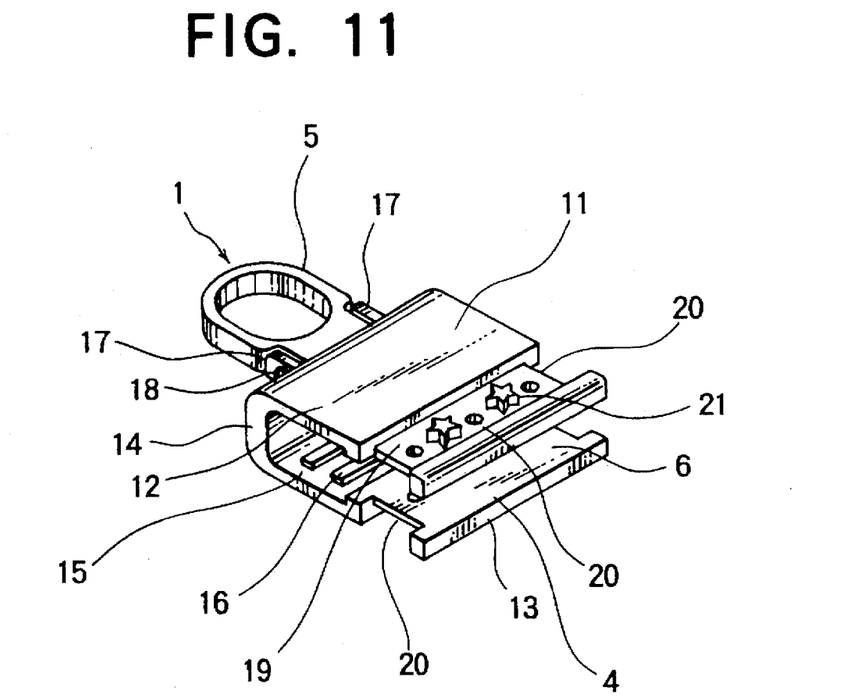
FIG. 11 is a perspective view showing a connector in the form of a modified C-shape tube according to a sixth embodiment.
Figure 12:
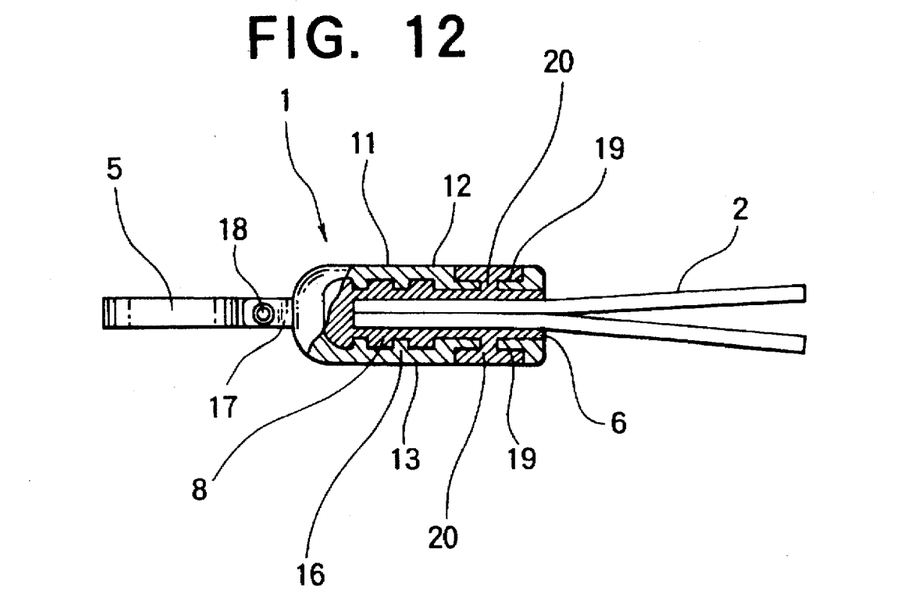
FIG. 12 is a side view, partly in cross section, of FIG. 11, showing a cord fixed to the connector of the sixth embodiment.
Figure 13:
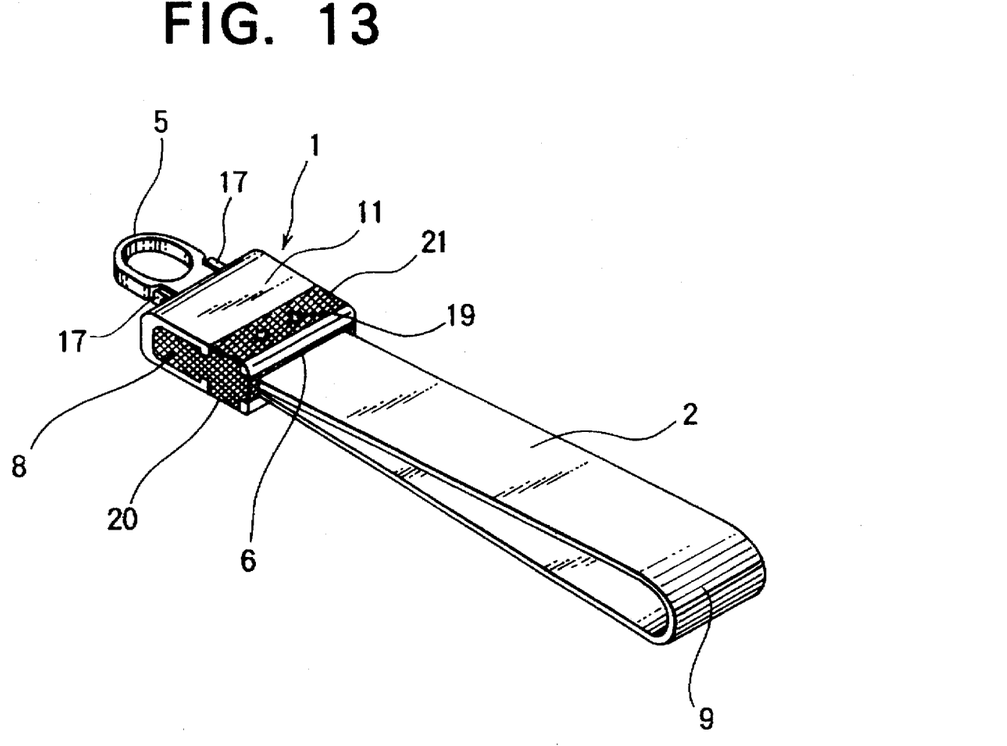
FIG. 13 is a perspective view showing a cord equipped with the connector of the sixth embodiment.

FIGS. 11 through 13 show still another embodiment in which the connector 1 in the form of a generally C-shape plate 11 has a pair of lugs 17 projecting outwardly from the connecting wall 14 bridging between the upper and lower walls 12, 13, between which one end of a connecting ring 5 is pivotally connected by a pivot pin 18.

Each of the upper and lower walls 12, 13 of the C-shape plate 11 has a number of ridges 16 on its inner surface except its side edges 15, and a recess 19 is provided on its outer surface at a position toward the open end, the recess 19 communicating with the hollow 4 via a number of apertures 20. Each of the upper and lower walls 12, 13 additionally has hieroglyphic ornaments 21 on the respective recess 19.

As shown in FIG. 12, end portions of the cord 2 are inserted in a trued-up form into the hollow 4 of the connector 1 from the opening 6, whereupon the hollow 4 and the recesses 19 are insertion-molded of synthetic resin to form a unitary molded core 8 so that the molded core 8 is prevented from removal from the hollow 4 as a hieroglyphic design is displayed as a negative pattern in each recess 19, giving a neat appearance to the connector-equipped cord as shown in FIG. 13.

Figure 14:
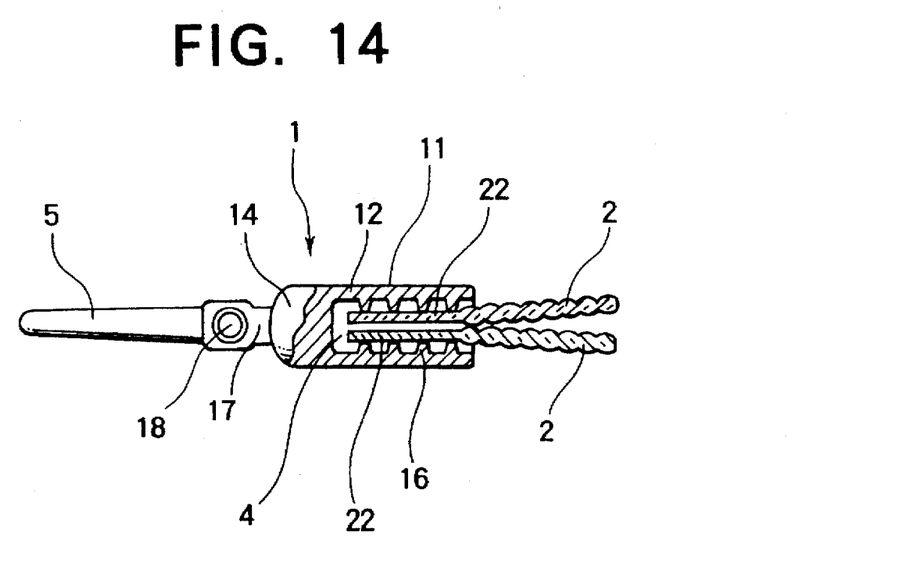
FIG. 14 is a side view, partly in cross section, of a cord equipped with a connector in the form of a generally C-shape plate.

FIG. 14 shows a further embodiment in which the connector 1 in the form of a generally C-shape plate 11 has a pair of lugs 17 projecting outwardly from the connecting wall 14 bridging between the upper and lower walls 12, 13, between which one end of a connecting ring 5 is pivotally connected by a pivot pin 18. Each of the upper and lower walls 12, 13 has on its inner surface a number of ridges 16. The end portions of the cord 2 to be clamped between the confronting ridges 16 of the upper and lower walls 12, 13 are compressed and hardened to form hardened end portions 22, facilitating insertion of the cord 2 into the hollow 4.

The hardening of the end portions of the cord 2 may be accomplished by soaking these end portions in synthetic resin liquid and then heating the soaked end portions for contraction. If the cord 2 is made of synthetic resin, this hardening may be accomplished by placing the end portions on an anvil, which has a cutting blade on its upper surface, and then pressing an ultrasonic horn against the end portions from the upper side, so that the cord 2 is cut and, at the same time, the end portions are compressed, thus ultrasonically processing the end portions into hardened end portions 22.

For an additional feature, each of the two end portions of the cord 2 may have a non-illustrated through-hole; if the two end portion of the cord 2 are inserted in a trued-up form, i.e. with their through-holes aligned, into the hollow 4 of the connector 1 and then the hollow 4 and the through-holes are filled with synthetic resin by insertion-molding, it is possible to attach the cord 2 precisely and firmly so that an adequately solid connector-equipped cord can be manufactured.

In this invention, the cord 2, which may be an existing knitted cord or a leather cord, is inserted into the hollow 4 of the connect 1 from the opening 6, whereupon synthetic resin is insertion-molded in the hollow 4 to form a molded core 8 to thereby fixedly attach the cord 2 to the connector 1. This connector-equipped cord is particularly useful when used as a pull string of a second bag, a folding umbrella, etc. The connector-equipped cord is connected to the good via the connecting ring 5.

Figure 15:
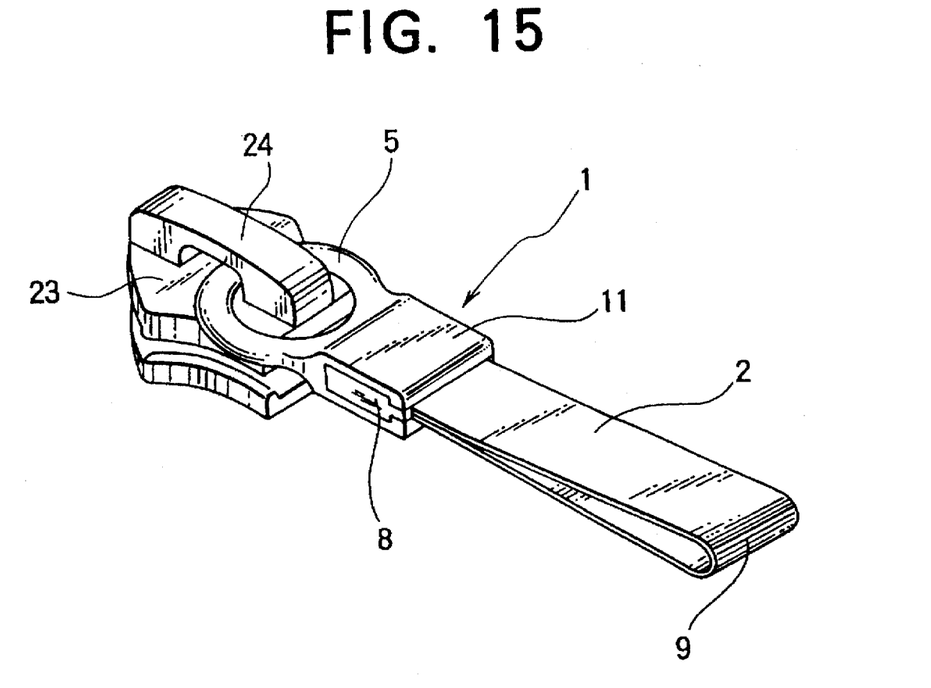
FIG. 15 is a perspective view showing a connector-equipped cord of this invention as applied to a pull tab of a slide fastener slider.

Further, the connector-equipped cord may be used as a slider pull tab of a slide fastener as shown in FIG. 15. For example, the connecting ring 5 is attached to a pull-tab attachment lug 24 of a slider 23, and the slide fastener is attached to an opening of an article, such as a second bag, a change purse or a pouch.

The connector-equipped cord of this invention has the following advantageous results:

According to the first aspect of the invention, end portions of the cord 2 are inserted into the hollow 4 of a connector 1, which has at one end a connecting ring 5 and at the other end an opening 6, from the opening 6, and synthetic resin is insertion-molded in the hollow 4 to form a molded core 8 to secure the cord 2, thus the connector 1 has a core-removal-preventing feature. With this arrangement, the cord 2 can be attached to the connector 1 simply and firmly as the molded core 8 is free from accidental removable from the hollow 4, making the connector-equipped cord suitable for repeated use.

According to the second aspect of the invention, since the connector 1 in the form of the cylindrical tube 3 has in its wall the through-hole 7 as a core-removal-preventing feature, the connector-equipped cord has an ideal form to effectively prevent the molded core 8 from removal and has a simple structure easy to manufacture.

According to the third aspect of the the invention, since the connector 1 in the form of the generally C-shape plate 11 has on its inner wall surface a number of ridges 16 serving as a core-removal-preventing feature, the connector-equipped cord has an ideal form to effectively prevent the molded core 8 from removal and has a simple structure easy to manufacture.

According to the fourth aspect of the invention, since the connector in the form of the cylindrical tube 3 or the generally C-shape plate 11 has the connecting ring 5 pivotally mounted on the closed end, it is possible to attach the connector to the article, for which the cord is to be used, in a simple procedure, and the cord 2 can be conveniently handled during use.

According to the fifth aspect of the invention, partly since the connector 1 has in its wall the hieroglyphic through-hole 7 which is to be filled with synthetic resin to display a hieroglyphic design on the outer wall surface, it is possible to give a neat appearance to the connector.

According to the sixth aspect of the invention, partly since each of upper and lower walls of the generally C-shape plate 11 has the recess 19 communicating with the hollow 4 via the apertures 20 and having the ornaments 21 on its surface, the recess 19 is easily filled with synthetic resin of the molded core 8, and it is possible to facilitate insertion-molding process and to give a neat appearance to the connector 1.

According to the seventh aspect of the invention, since end portions of the cord 2 are compressed and hardened as the hardened end portions 22, it is possible to insert the cord 2 into the connector 1 with maximum ease even if the cord 2 has a soft delicate touch.

According to the eighth aspect of the invention, since the cord 2 is attached to the connector 1 so as to form a loop 9 at its free end, it is possible to use the connector-equipped cord as a pull string or a pull tab for a wide variety of articles.

In this invention, the number of the through-hole 7, the ridge 16, the aperture 20, and the ornament 21 may be one or more than one.

What is claimed is:

1. A cord equipped with a connector, wherein said connector has at one end a connecting ring and at the other end an opening, said connector having a hollow into which two free end portions of said cord are inserted from said opening, said free end portions of said cord being fixed by a molded core which is insertion-molded of synthetic resin in said hollow, said hollow having a mechanism for preventing said molded core from accidental removal from said hollow.

2. A cord equipped with a connector according to claim 1, wherein said connector is a cylindrical tube having in its wall at least a through-hole communicating with said hollow, said molded core engaging said through-hole to provide said removal-preventing mechanism.

3. A cord equipped with a connector according to claim 1, wherein said connector is a generally C-shape plate having at least a ridge on its inner wall surface except its side edge, said ridge providing said removal-preventing mechanism.

4. A cord equipped with a connector according to claim 3, wherein said connector is a generally C-shape plate having at least a ridge on its inner wall surface except its side edges, said plate further having on each of front and rear walls a recess communicating with said hollow via at least an aperture, said recess having at least an ornament projecting thereon, said molded core being formed complementarily with said hollow and said recess to fix said end portions of said cord.

5. A cord equipped with a connector according to claim 1, wherein said connecting ring is pivotally mounted on a closed end of said connector.

6. A cord equipped with a connector according to claim 1, wherein said connector has in its wall a hieroglyphic through-hole which is to be filled with said molded core to reveal a hieroglyphic design.

7. A cord equipped with a connector according to claim 6, wherein said connector is a generally C-shape plate having at least a ridge on its inner wall surface except its side edges, said plate further having on each of front and rear walls a recess communicating with said hollow via at least an aperture, said recess having at least an ornament projecting thereon, said molded core being formed complementarily with said hollow and said recess to fix said end portions of said cord.

8. A cord equipped with a connector according to claim 1, wherein said end portions of said cord to be fixed to said connector are in the form of compressed and hardened portions inserted in said hollow and fixed by said molded core and wherein said compressed and hardened portions are compressed and hardened prior to being inserted in said hollow and fixed by said molded core.

9. A cord equipped with a connector according to claim 8, wherein said cord fixed by said connector defines a loop at its free end.

10. A cord equipped with a connector according to claim 1, wherein said cord fixed by said connector defines a loop at its free end.

11. A cord equipped with a connector, wherein said connector has at one end a connecting ring and at the other end an opening, said connector having a hollow into which end portions of said cord are inserted from said opening, said end portions of said cord being fixed by a molded core insertion-molded of synthetic resin in said hollow, said hollow having a mechanism for preventing said molded core from accidental removal from said hollow;

wherein said connecting ring is pivotally mounted on a closed end of said connector;

wherein said connector is a generally C-shape plate having at least a ridge on its inner wall surface except its side edges, said plate further having on each of front and rear walls a recess communicating with said hollow via at least an aperture, said recess having at least an ornament projecting thereon, said molded core being formed complementarily with said hollow and said recess to fix said end portions of said cord.

12. A lightweight cord assembly for pulling small articles, comprising:

a connector, having at one end a connecting ring and at another end an opening, said connector having a hollow;

a lightweight cord having two free end portions inserted from said opening into said hollow;

a molded core, insertion-molded of synthetic resin in said hollow, embedding said free end portions, said hollow having a mechanism for preventing said molded core from removal from said hollow.

13. The assembly according to claim 12, wherein said connector is a cylindrical tube having in its wall at least a through-hole communicating with said hollow, said molded core engaging said through-hole to provide said removal-preventing mechanism.

14. The assembly according to claim 12, wherein said connector is a generally C-shape plate having at least a ridge on its inner wall surface except its side edge, said ridge providing said removal-preventing mechanism.

15. The assembly according to claim 14, wherein said connector is a generally C-shape plate having at least a ridge on its inner wall surface except its side edges, said plate further having on each of front and rear walls a recess communicating with said hollow via at least an aperture, said recess having at least an ornament projecting thereon, said molded core being formed complementarily with said hollow and said recess to fix said end portions of said cord.

16. The assembly according to claim 12, wherein said connecting ring is pivotally mounted on a closed end of said connector.

17. The assembly according to claim 16, wherein said connector is a generally C-shape plate having at least a ridge on its inner wall surface except its side edges, said plate further having on each of front and rear walls a recess communicating with said hollow via at least an aperture, said recess having at least an ornament projecting thereon, said molded core being formed complementarily with said hollow and said recess to fix said end portions of said cord.

18. The assembly according to claim 12, wherein said connector has in its wall a hieroglyphic through-hole which is to be filled with said molded core to reveal a hieroglyphic design.

19. The assembly according to claim 18, wherein said connector is a generally C-shape plate having at least a ridge on its inner wall surface except its side edges, said plate further having on each of front and rear walls a recess communicating with said hollow via at least an aperture, said recess having at least an ornament projecting thereon, said molded core being formed complimentarily with said hollow and said recess to fix said end portions of said cord.

20. The assembly according to claim 12 wherein said end portions of said cord to be fixed to said connector is in the form of compressed and hardened portions inserted in said hollow and fixed by said molded core.

21. The assembly according to claim 20, wherein said cord fixed by said connector defines a loop at its free end.

22. The assembly according to claim 12, wherein said cord fixed by said connector defines a loop at its free end.

* * * * *